July 17, 1934.  L. C. TILBURY  1,966,693
SLIP
Filed June 26, 1933  2 Sheets-Sheet 1

Inventor
Lyle C. Tilbury

By Hardway Cathey
Attorneys

July 17, 1934.  L. C. TILBURY  1,966,693

SLIP

Filed June 26, 1933   2 Sheets-Sheet 2

Inventor
Lyle C. Tilbury
By Hardway Mather
Attorneys

Patented July 17, 1934

1,966,693

UNITED STATES PATENT OFFICE 1,966,693

SLIP

Lyle C. Tilbury, Houston, Tex.

Application June 26, 1933, Serial No. 677,653

10 Claims. (Cl. 24—263)

This invention relates to a slip.

An object of the invention is to provide a slip, or pipe holder, adapted to be seated in a downwardly converging seat of a rotary table or other support and shaped to surround a pipe to be suspended from said support and to grip and securely hold said pipe.

Another object of the invention is to provide a slip formed of independent sections which are made up of segments connected together in a novel manner.

Another object of the invention is to provide novel means for connecting the segments of which the slip sections are composed.

A further feature is to provide a novel type of handle by means of which the sections may be handled.

With the above and other objects in view the invention has particular relation to certain novel features of construction, arrangement of parts and use, an example of which is given in this specification and illustrated in the accompanying drawings, wherein:—

Figure 4:
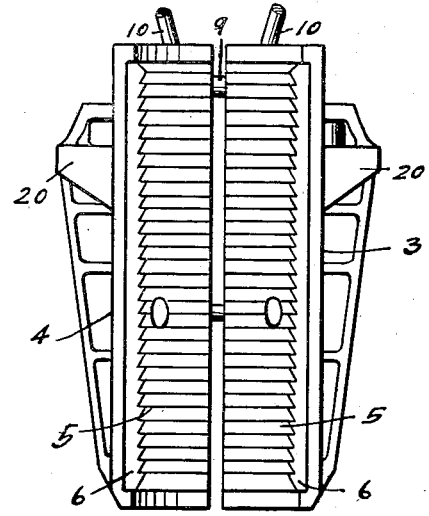
Figure 4 shows an inside view thereof.

Referring now more particularly to the drawings wherein like numerals of reference designate similar parts in each of the figures, the numerals 1, 2 designate the sections of a slip. Each section is made up of the segments 3, 4. The inner faces of these segments are arcuate and are provided with the inside teeth 5 shaped to engage about the pipe to be held. These teeth may be formed directly on the segments or may be carried by removable, inside liners 6, as more clearly shown in Figures 2 and 4.

The external surfaces of the segments are reduced, in width, and are tapered downwardly to conform to the shape of, and to fit within, the downwardly converging seat of the rotary table or other support.

The adjacent margins of the segments 3, 4 have the lugs 7, 8 provided with aligned bearings to receive bolts 9. There are the handles comprising the side bars 10, 10 and the grips 11. The inner ends of the side bars embrace the corresponding pairs of lugs, and the bolts 9 pass through bearings in said ends of said side bars, each bolt being retained in place by the usual head on one end and nut on the other end. The bolts 9 thus serve not only to secure the segments of a slip section together but also form an anchorage for the corresponding handle of said section. Intermediate the upper and lower ends of each section, the segments thereof have the marginal aligned lugs 12, 13 having suitable aligned bearings to receive the bolts 14, said bolts 14 having the usual heads on one end and nuts on their other ends.

The bolts 9, 14 of each section are fitted through the bearings of their corresponding lugs with sufficient looseness to give to the slip the required flexibility.

In order to maintain the segments of each slip section in proper transverse alignment, each section is provided with an arcuate plate 15. The ends of the plate of each section are fitted into the transversely aligned bearings 16, 16 of the respective segments and are pivoted therein by the pins or bolts 17, 17. These plates 15 fit closely underneath the corresponding lugs 7, 8 and between said lugs 7, 8 and the marginal lugs 18, 19 formed on the margins of the respective segments. In other words, the arcuate plates 15 fit closely between the lugs 7, 8, above and the corresponding lugs 18, 19 beneath, so that the segments of the slip section will be maintained in proper transverse alignment to the end that when the slip section is inserted into the seat of the rotary table or other support, the segments will be maintained in alignment and will grip the pipe to be held uniformly.

The confronting margins of the respective sections have the outwardly directed lugs 20. These lugs increase the maximum transverse diameter of each section of the slip so that should a single section be inadvertently dropped into the seat of the rotary table, it could not pass through the restricted lower end of the seat and drop into the well bore.

Figure 1:
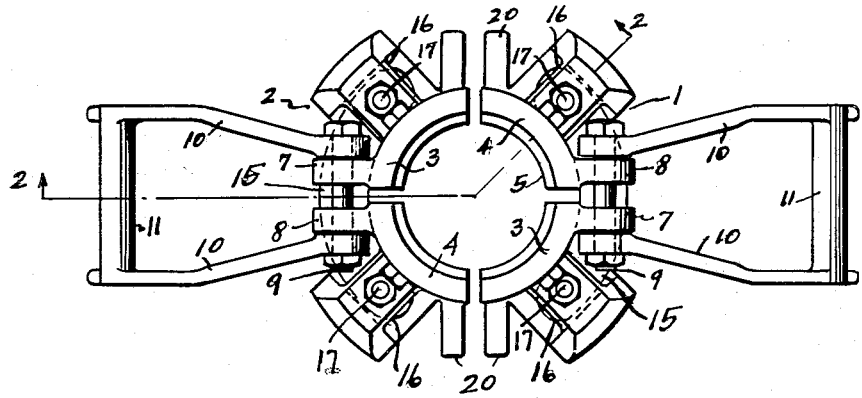
Figure 1 shows a plan view of the slip.
Figure 2:
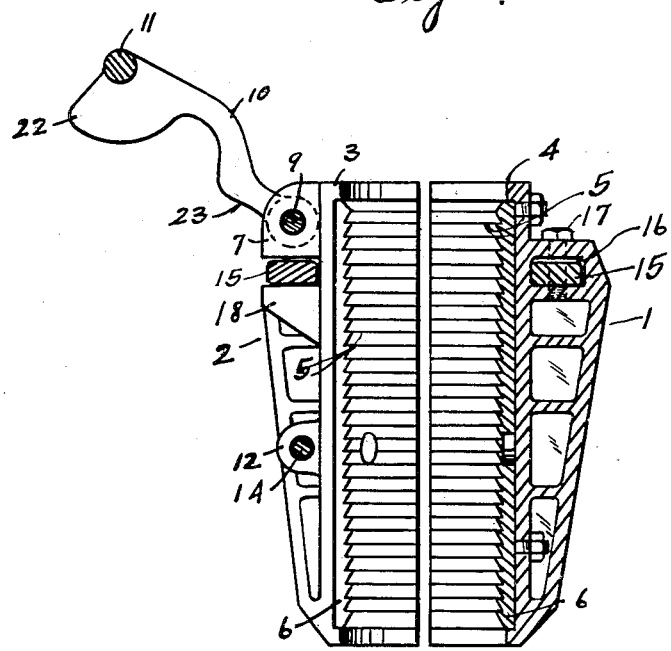
Figure 2 shows a vertical sectional view taken on the line 2—2 of Figure 1.
Figure 3:
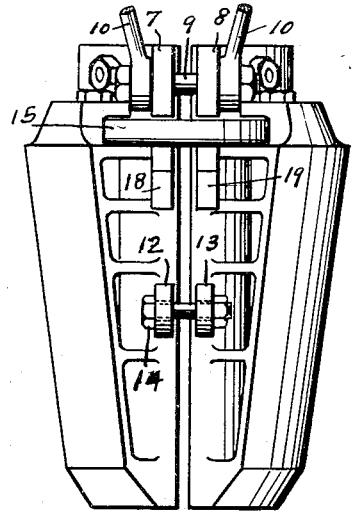
Figure 3 shows a side view of one of the slip sections.
Figure 5:
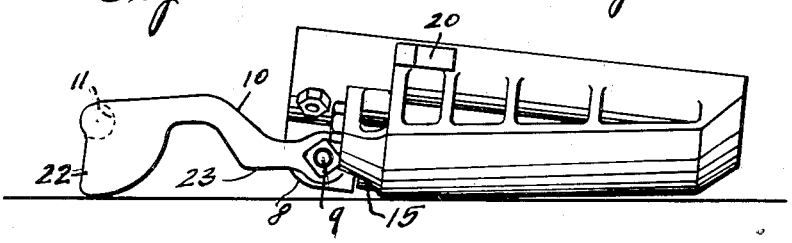
Figure 5 shows an edge view of a slip section shown in position on the rotary table, to be manipulated into pipe holding position.
Figure 6:
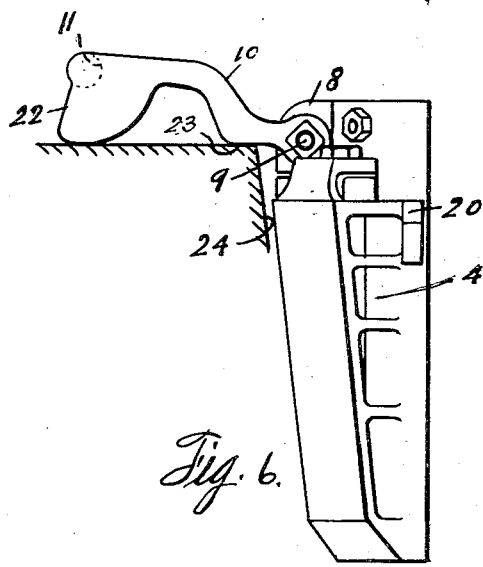
Figure 6 shows an edge view of a slip section as being lowered into active position in the rotary table seat.

The handles, by means of which the slip sections are held, and manipulated, are of special construction, as is more accurately shown in Figures 2, 5 and 6. They are formed with the wing like guards 22 on opposite sides of the grip 11. These guards protect the hands of the workman by shielding them from coming into contact with other objects about the derrick floor in carrying on drilling operations. Furthermore when the slip is not in use the sections will usually be placed one on each side of the rotary table and in the position shown in Figure 5 in readiness to be inserted into the seat of the rotary table around the pipe. In this position the grip 11 will be held elevated above the table so that it can be quickly and easily grasped without the hand of the workman coming into contact with the rotary table.

Also it is to be noted that each side bar 10 has an outside flat face 23 adjacent the pivoted end of the bar. The purpose of these faces is well illustrated in Figure 6. In inserting the slip around the pipe to be held, one workman is located on each side of the pipe and the slip sections are gradually lowered into the seat 24 of the rotary table from opposite sides. The slip sections can be readily hung in the seat by resting the faces 23 on the top of the rotary table as shown in Figure 6 and by holding down on the grip 11, the corresponding slip section can be maintained in said position until the pipe is in the proper position and until both workmen are ready to simultaneously release the slip sections so that they will seat at exactly the same time in proper alignment in the seat 24 about the pipe. At this time, the outer ends of the handles may be gradually elevated and the slip permitted to gradually seat in the seat 24 in position about the pipe to be held.

The drawings and description disclose what is now considered to be a preferred form of the invention by way of illustration only while the broad principle of the invention will be defined by the appended claims.

What I claim is:

1. A pipe holding slip composed of sections, each section being formed of segments, and transverse bolts loosely connecting said segments.

2. A pipe holding slip composed of sections, each section being composed of segments, lugs on adjacent margins of the segments, bolts through said lugs loosely connecting said segments together and a handle having side arms which embrace the lugs of a section and which have bearings on the corresponding bolt.

3. A pipe holding slip composed of sections, each section being composed of segments, means connecting adjacent margins of the segments together, an arcuate plate whose ends are pivotally connected to the segments of each section said segments having external aligned notches in which the corresponding plate works.

4. In a slip, a slip section composed of separate segments said segments having external, aligned notches, an arcuate plate which works in said notches and whose ends are pivotally connected to said segments.

5. In a slip a section composed of adjacent segments having external transversely aligned notches, a transverse bolt connecting said segments adjacent their upper ends, a handle composed of side bars provided with bearings at one end through which the bolt passes, a grip connecting the other ends of said side bars and an arcuate plate lying in said notches and whose ends are pivoted to the segments.

6. In a slip a section composed of adjacent segments, a transverse bolt connecting said sections adjacent their upper ends, a handle composed of side bars provided with bearings at one end through which the bolt passes, a grip connecting the other ends of said side bars, and wing-like guards on said side bars on opposite sides of said grip.

7. In a slip a section composed of adjacent segments, a transverse bolt connecting said segments adjacent their upper-ends, a handle composed of side bars provided with bearings at one end through which the bolt passes, a grip connecting the other ends of said side bars, said bars having outside, supporting faces adjacent the pivoted ends of the bars.

8. In a slip a section composed of two segments, means connecting the adjacent margins of said segments loosely together, and outwardly turned lugs on the other margins of said segments serving to increase the maximum transverse diameter of the section.

9. In a pipe holding slip, a slip section composed of segments whose adjacent margins have upper and lower outwardly turned lugs, upper and lower bolts through said lugs securing said segments loosely together, an arcuate plate whose ends are pivotally connected to said segments, a handle having side bars provided, at one end, with bearings on the upper bolt and a grip connecting the other ends of said side bars.

10. In a slip a section, a handle having side bars which are pivotally connected, at one end, to the section, a grip connecting the other ends of the side bars, said bars having outside supporting faces adjacent the pivoted ends of the bars.

LYLE C. TILBURY.